No. 737,021.

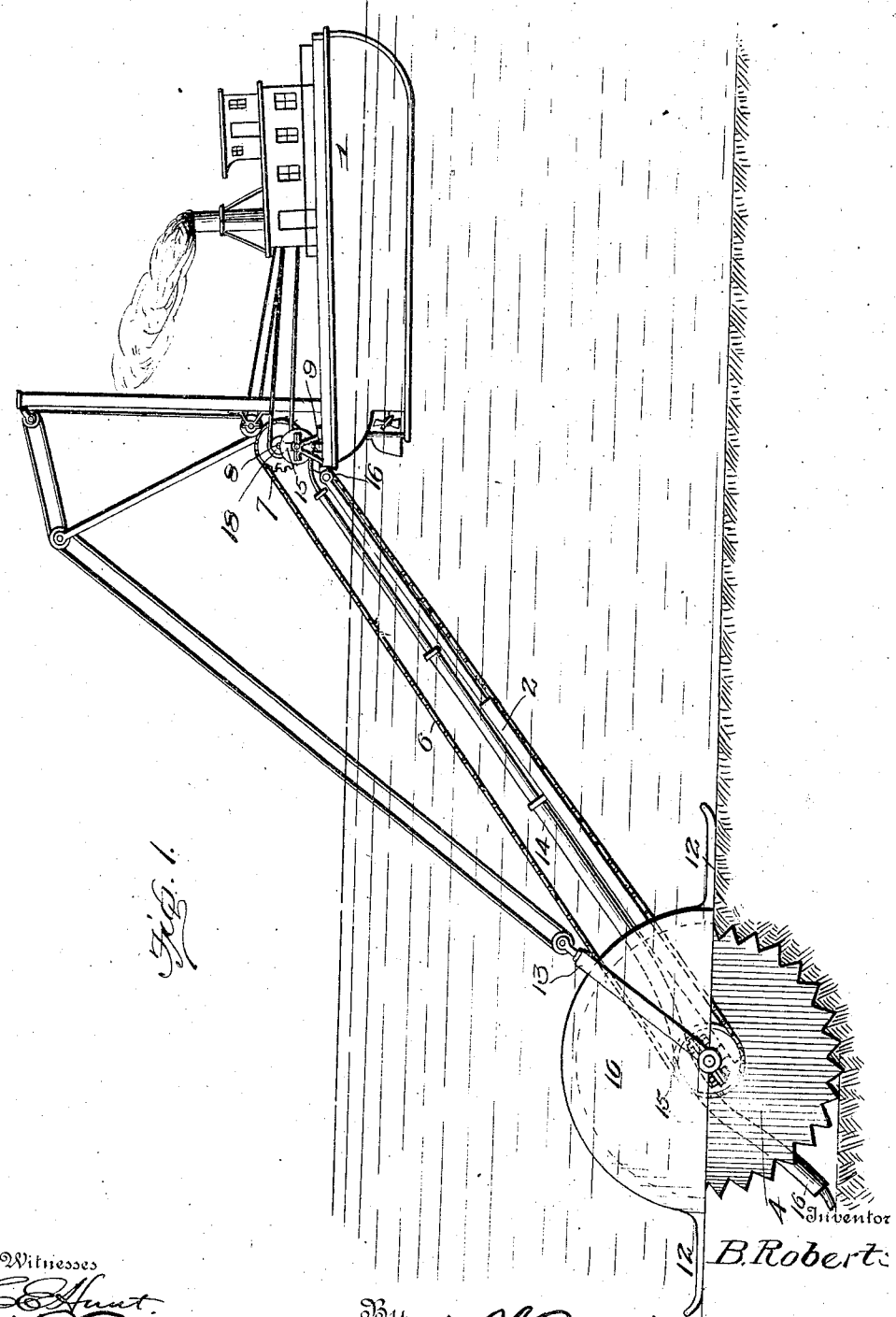

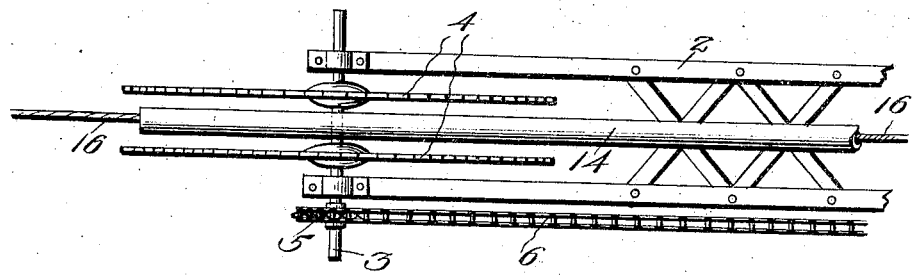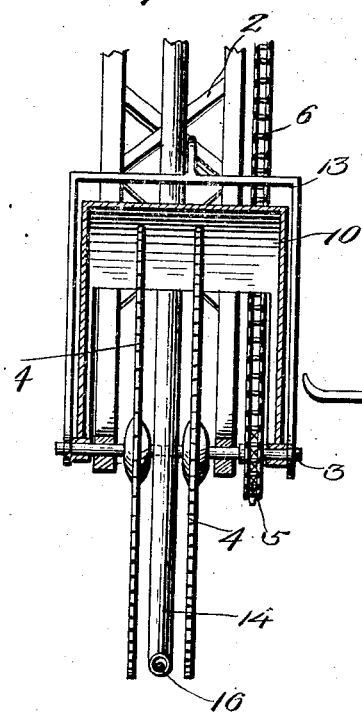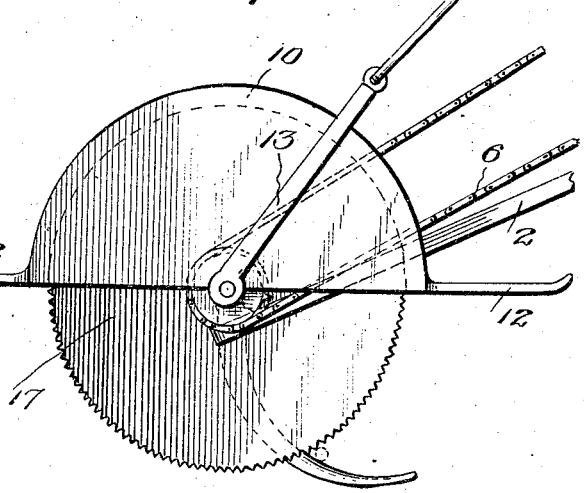

Patented August 25, 1903.

UNITED STATES PATENT OFFICE.

BEAUREGARD ROBERTS, OF MOBILE, ALABAMA.

SUBMARINE-CABLE-LAYING DEVICE.

SPECIFICATION forming part of Letters Patent No. 737,021, dated August 25, 1903.

Application filed May 29, 1902. Renewed July 16, 1903. Serial No. 165,874. (No model.)

*To all whom it may concern:*

Be it known that I, BEAUREGARD ROBERTS, a citizen of the United States, residing at Mobile, in the county of Mobile and State of Alabama, have invented certain new and useful Improvements in Submarine-Cable-Laying Devices; and I do declare the following to be a full, clear, and exact description of the invention, such as will enable others skilled in the art to which it appertains to make and use the same.

The invention relates to devices for laying submarine cables.

The object of the invention is to provide a device for this purpose in the form of a rotary plow or saw by which a trench or furrow may be made in the bottom of a body of water of any desired depth and in which a cable is adapted to be laid.

A further object is to provide a device whereby the rotary digging apparatus may be adapted to be interchangeable with a cable-cutting apparatus for finding and severing a cable.

With the above and other objects in view, the nature of which will be apparent as the invention is better understood, said invention consists in the construction and arrangement of parts, which will be hereinafter more fully described and claimed, reference being had to the accompanying drawings, in which—

Figure 1 is a side elevation of the device in use, parts being broken away for illustration. Fig. 2 is a top plan view of the digging devices. Fig. 3 is a vertical cross-section of the same on the line *x x* of Fig. 1. Fig. 4 is a side view showing the device when used for cutting cables.

In the drawings, 1 denotes a steamboat or barge for carrying the operating apparatus.

2 denotes an adjustable framework, which is suitably connected to the stern of the boat to swing in an up and downward direction.

3 denotes a shaft journaled in the lower end of the framework 2, having mounted thereon one or more rotary plows 4, each consisting of a circular flat metal disk provided on its periphery with a series of teeth or cutting-blades, which may be of any suitable shape or form and may be cast integral with the disks or bolted to the same. In the drawings I have shown them in the shape of saw-teeth and cast integral with the disks.

5 denotes a sprocket-wheel fixed to one end of the shaft 3 and connected by a sprocket-chain 6 to a sprocket-wheel 7, fixed to a shaft 8, journaled in bearings on standards 9, mounted on the stern end of the boat.

10 denotes a semicircular-shaped casing adapted to be supported by the shaft 3, and 12 denotes shoes or runners projecting forwardly and rearwardly of the casing 10 and connected thereto. These shoes are adapted to rest on and slide along the surface of the bottom of the body of water and support the digging apparatus at the proper position and prevent the same from digging too deep.

13 denotes a bail or link connected at its lower ends to the shaft 3 and is provided at its upper end with a pulley-block, through which is rove a hoisting rope or cable running to a suitable crane or derrick mounted upon the boat.

14 denotes a pipe or conduit which may be made in telescoping sections to be lengthened or shortened as desired. The upper end of this pipe or conduit is connected to the boat adjacent to a reel 15, on which the cable 16 is wound. The other end of the pipe extends downwardly to a position between or alongside the rotary disks 4. The cable 16 is adapted to run through this pipe or conduit and be guided and protected thereby and to be delivered into the bottom of the trench cut by the rotary plows.

In Fig. 4 of the drawings I have shown a disk 17 in the form of a fine-toothed circular saw. This disk is adapted to be interchangeable with the digging-disks, so that should it be desired to use the device for cutting cables the rotary plow-disks are removed and the fine saw placed in position, when the apparatus will be in readiness for sawing or cutting cables when dragged along by the boat.

Any suitable means may be employed for imparting motion to the rotary plows and cutting devices through the medium of the sprocket-gearing hereinbefore described. That shown in the drawings consists in providing the shaft 8 with a band-pulley 18, around which passes a belt from the drive-wheel of an engine. (Not shown.) It will be understood in this connection that I do not wish to confine myself to a sprocket-chain connection between the shafts 3 and 8, as it is obvious that I may use a shaft and beveled gears to accomplish the same purpose.

From the foregoing description, taken in connection with the accompanying drawings, the construction, operation, and advantages of my invention will be readily apparent, it is thought, without requiring a more extended explanation.

Various changes in the form, proportion, and minor details of construction may be resorted to without departing from the principle or sacrificing any of the advantages of my invention.

Having thus described my invention, what I claim, and desire to secure by Letters Patent, is—

1. In a device for laying submarine cables, the combination of a rotary-disk plow, a frame having a hinged connection at its upper end to a boat and adapted to carry said rotary plow at its lower end, a conduit adapted to conduct a cable from said boat to a point of discharge adjacent to said plow, a crane or derrick adapted to raise and lower said hinged frame and plow, and means for supporting said plow at proper cutting depth substantially as set forth.

2. In a device for laying submarine cables, the combination of one or more rotary-disk plows mounted on a common shaft, an adjustable frame having a hinged connection to a boat at its upper end and adapted to carry said shaft and disk plows at its lower end, a sprocket-wheel fixed to said shaft, a sprocket-chain connecting said sprocket-wheel with a similar wheel fixed to a driven shaft mounted on said boat, whereby motion from said shaft will be imparted to said rotary plows, a conduit adapted to conduct a cable from said boat to a point of discharge adjacent to said plows, a crane or derrick adapted to raise or lower said digging apparatus, a casing or covering for said plows, and means for supporting said plows at the proper cutting depth, substantially as and for the purpose set forth.

In testimony whereof I have hereunto set my hand in presence of two subscribing witnesses.

BEAUREGARD ROBERTS.

Witnesses:
P. J. SCHENERMANN,
W. F. SIMSON.